United States Patent [19]
Inoue

[11] Patent Number: 6,006,353
[45] Date of Patent: Dec. 21, 1999

[54] ERROR CORRECTION METHOD FOR RADIO COMMUNICATION AND RADIO COMMUNICATION APPARATUS

[75] Inventor: Fumio Inoue, Kasuga, Japan

[73] Assignee: Matsushita Electric Industrial Co. Ltd., Osaka, Japan

[21] Appl. No.: 08/946,979

[22] Filed: Oct. 8, 1997

[30] Foreign Application Priority Data

Oct. 14, 1996 [JP] Japan .................................. 8-270448

[51] Int. Cl.$^6$ .................................................. G01R 31/28
[52] U.S. Cl. .......................................... 714/752; 714/712
[58] Field of Search ................................... 714/712, 746, 714/751, 752, 776, 781, 782, 783, 784; 375/244, 242, 243, 224; 379/1

[56] References Cited

U.S. PATENT DOCUMENTS

| | | | |
|---|---|---|---|
| 5,517,512 | 5/1996 | Saegusa | 714/781 |
| 5,799,039 | 8/1998 | Laird et al. | 714/758 |
| 5,802,080 | 9/1998 | Westby | 714/758 |

FOREIGN PATENT DOCUMENTS 53-53205   5/1978   Japan .

*Primary Examiner*—Trinh L. Tu
*Attorney, Agent, or Firm*—Stevens, Davis, Miller & Mosher, L.L.P.

[57] ABSTRACT

A plurality of generator polynomials are prepared for error correction and stored in a table by assigning a specific table number to each generator polynomial. Each generator polynomial provides a different error correction capability so that a different number of error correction bits are added to each set of transmission data. For radio communication, an electric field intensity is first measured, and in accordance with this electric field intensity, a generator polynomial to be used at that time for error correction calculation is determined. It is therefore possible to change the number of error correction bits in accordance with the environment at that time and to perform efficient error correction. For example, if a base station is in a near area, an error rate is small so that the number of addition bits is reduced.

6 Claims, 4 Drawing Sheets

FIG. 3

| ELECTRIC FIELD INTENSITY | GENERATOR POLYNOMAL TABLE NUMBER | GENERATOR POLYNOMAL g(x) | FEC ADDITION BIT NUMBER |
|---|---|---|---|
| HIGH | $y_l$ | $g(x) = a_{l-k-1} \cdot x^{l-k-1} + a_{l-k-2} \cdot x^{l-k-2} + a_{l-k-3} \cdot x^{l-k-3} + \cdots + a_1 \cdot x + a_0$ | $l-k$ |
| ... | ... | ... | ... |
| MIDDLE | $y_m$ | $g(x) = a_{m-k-1} \cdot x^{m-k-1} + a_{m-k-2} \cdot x^{m-k-2} + a_{m-k-3} \cdot x^{m-k-3} + \cdots + a_1 \cdot x + a_0$ | $m-k$ |
| ... | ... | ... | ... |
| LOW | $y_n$ | $g(x) = a_{n-k-1} \cdot x^{n-k-1} + a_{n-k-2} \cdot x^{n-k-2} + a_{n-k-3} \cdot x^{n-k-3} + \cdots + a_1 \cdot x + a_0$ | $n-k$ |

※ NOTE $n > m > l > k$

ERROR CORRECTION METHOD FOR RADIO COMMUNICATION AND RADIO COMMUNICATION APPARATUS

BACKGROUND OF THE INVENTION

1. Field of the Invention

The present invention relates to an error correction method and a radio communication apparatus for communicating over a mobile communication network with its error rate changing from time to time.

2. Description of the Related Art

Second-generation mobile communication systems characterized in digital communication are prevailing rapidly. For example, Personal Handyphone System (PHS) widely used in Japan adopts a scheme of Time Division Multiplex Access/Time Division Duplex (TDMA/TDD). This PHS scheme has a transmission capacity of 32 kbps per slot so that not only audio signals, data signals and still image signals, but also moving image signals can be transmitted. This PHS scheme is therefore much expected as the infrastructure capable of realizing mobile multimedia communication.

A conventional error correction method will be described. FIG. 4 is a block diagram showing a conventional radio communication apparatus. In FIG. 4, reference numeral 1 represents a forward error correction (FEC) operator unit, reference numeral 2 represents a multiplexer, reference numeral 3 represents a baseband processor unit, reference numeral 4 represents a radio frequency (RF) module, reference numeral 5 represents a separator, reference numeral 6 represents an FEC unit, and reference numeral 7 represents a generator polynomial table.

FIG. 5 shows a configuration of a packet used for data transfer between radio communication apparatuses such as shown in FIG. 4. In FIG. 5, reference numeral 25 represents a packet start detection flag field, reference numeral 26 represents an address field, reference numeral 27 represents a control field, reference numeral 28 represents a data field, reference numeral 29 represents an FEC addition bit field, and reference numeral 30 represents a packet end detection flag field.

Referring to FIG. 4, data to be transmitted is input to the FEC operator unit 1 and multiplexer 2. This data includes audio data, moving picture data, or the like to be loaded in the data field 28 shown in FIG. 5, and data to be loaded in the address and control fields 26 and 27 shown in FIG. 5. The address field 26 is used for the supply of discrimination information of communication partners, and the control field 27 is used for the supply of a frame type and a transmission/reception sequential order.

The FEC operator unit 1 calculates FEC addition bits by using a generator polynomial of a single type output from the generator polynomial table 7. FEC is one type of error correction method and is adopted by PHSs.

As the transmission data is input to the FEC operator unit 1, this unit 1 outputs FEC addition bits which are multiplexed with the transmission data by the multiplexer 2. This multiplexer 2 also multiplexes the data in the packet start and end detection flag fields 25 and 30 shown in FIG. 5 to configure a transmission packet shown in FIG. 5.

The baseband processor unit 3 shown in FIG. 4 performs a baseband signal communication process in accordance with protocols of a mobile communication network. Specifically, the baseband processor unit 3 loads a transmission packet supplied from the multiplexer 2 on the baseband signal, and unloads a reception packet supplied from the RF module 4 from the baseband signal. The RF module 4 modulates the baseband signal to generate radio signals, and demodulates received radio signals into the baseband signal.

The separator 5 separates a received packet into FEC addition bits and reception data before the error correction. The FTC unit 6 performs error detection and correction of the reception data in accordance with the FEC addition bits output from the separator 5, by using a generator polynomial of the single type output from the generator polynomial table 7.

Next, error correction will be described. For the error correction, binary cyclic codes (n, k) of the Bose-Chaudhuri-Hocquenghem (BCH) code system are used, where n indicates a code length and k indicates the number of information points. The code length n is the total number of bits in the address field 26, control field 27, data field 28 and FEC addition bit field 29. The number k of information points is the total number of bits in the address field 26, control field 27 and data field 28. Therefore, the number of bits in the FEC addition bit field 29 is (n–k). In this case, the generator polynomial g(x) is given by the following equation.

$$g(x) = a_{n-k-1} \cdot X^{n-k-1} + a_{n-k-2} \cdot X^{n-k-2} + a_{n-k-3} \cdot X^{n-k-3} + \ldots + a_1 \cdot X + a_0$$

The above-described error correction method has, however, a limited error correction capability because it uses only one type of generator polynomial. Therefore, if errors in excess of the error correction capability are generated, these excessive errors cannot be corrected.

SUMMARY OF THE INVENTION

The present invention aims at solving the above problem and providing an error correction method and a radio communication apparatus capable of performing reliable error correction in accordance with a predicted error rate.

According to one aspect of the present invention, a radio communication apparatus comprises: electric field intensity measuring means for measuring electric field intensity of a radio wave received by an RF (radio frequency) module and outputting the measured electric field intensity; generator polynomial determining means for determining a generator polynomial, which is used to generate error correction additional bits, in accordance with the measured electric field intensity output from the electric field intensity measuring means; and an error correction operator unit for calculating error correction addition bits of transmission data by using the generator polynomial determined by the generator polynomial determining means, wherein a generator polynomial number representative of the generator polynomial determined by the generator polynomial determining means is multiplexed with the transmission data and transmitted.

According to another aspect of the invention, an error correction method comprises the steps of: measuring electric field intensity by using received power information supplied by an RF module; determining a generator polynomial, which is used to generate error correction addition bits, in accordance with the measured electric field intensity; calculating the error correction addition bits of transmission data by using the determined generator polynomial before the transmission data is transmitted; multiplexing a number representative of the determined generator polynomial, the calculated error correction addition bits, and the transmission data to transmit a multiplexed signal; separating a reception packet into reception data before error correction, the error correction addition bits, and the number representative of the determined generator polynomial, determining a generator polynomial in accordance with the number representative of the separated generator polynomial, detecting and correcting any error of the reception data before error correction and recovering error-corrected reception data by using the determined generator polynomial and the error correction addition bits separated from the reception packet.

Since a random error rate can be predicted from the measured electric field intensity of a signal received by the RF module, more reliable error correction suitable for a random error rate at that time can be performed.

BRIEF DESCRIPTION OF THE DRAWINGS

FIG. 3 is a diagram showing a generator polynomial table according to the embodiment of the invention.

DETAILED DESCRIPTION OF THE PREFERRED EMBODIMENTS

Figure 1:
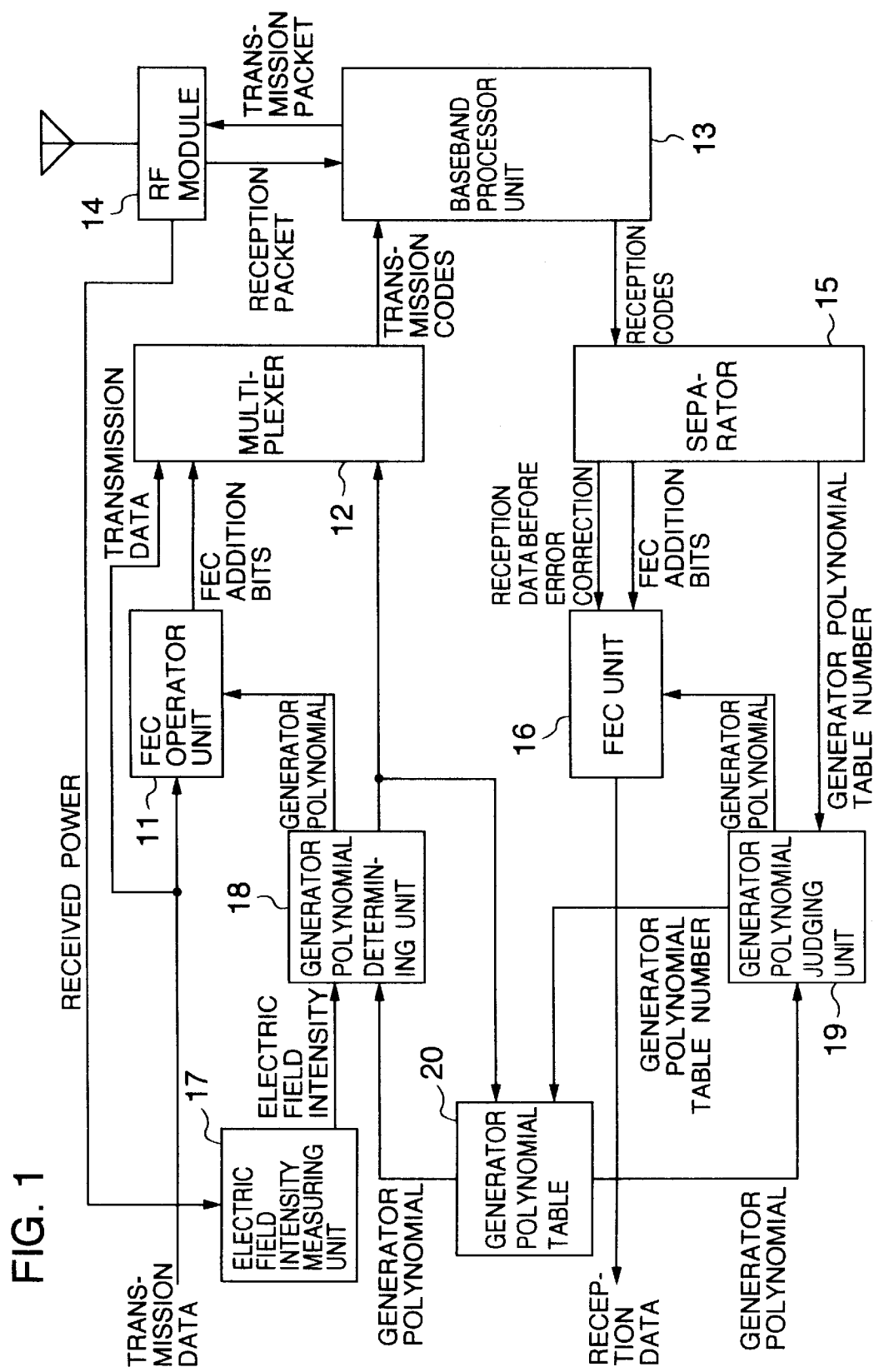
FIG. 1 is a block diagram showing a radio communication apparatus according to an embodiment of the invention.
Figure 2:
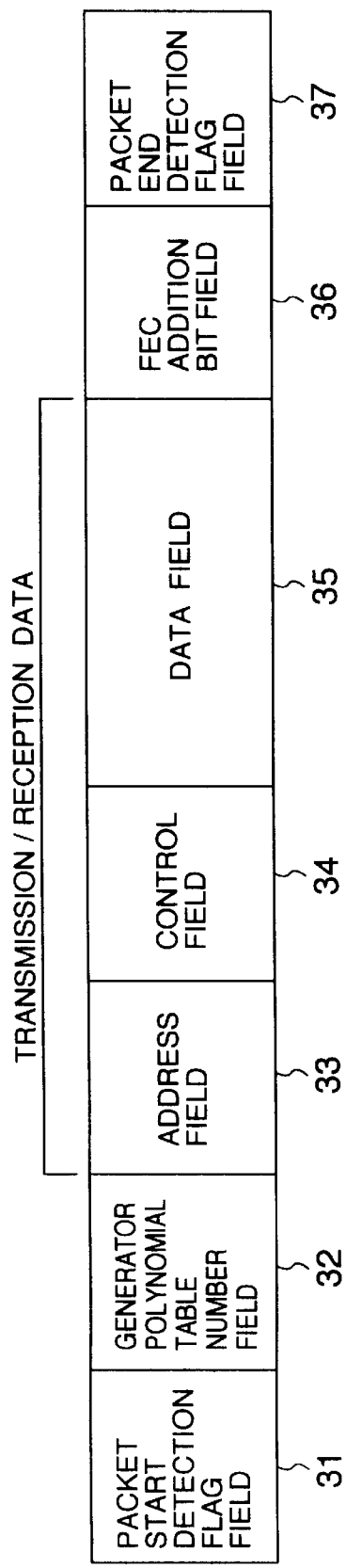
FIG. 2 is a diagram showing the configuration of a packet used for data transfer between radio communication apparatuses according to the embodiment of the invention.
Figure 5:
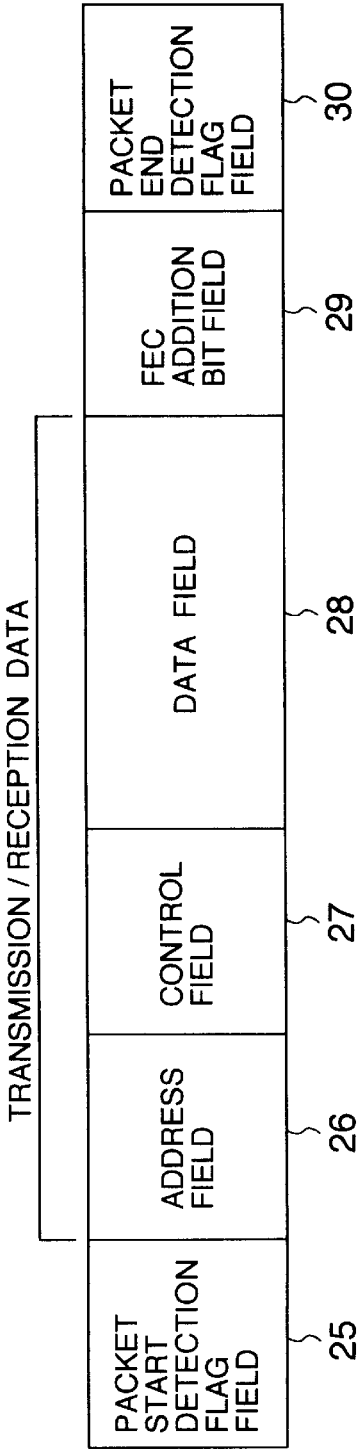
FIG. 5 is a diagram showing the configuration of a packet used for data transfer between conventional radio communication apparatuses.
Figure 4:
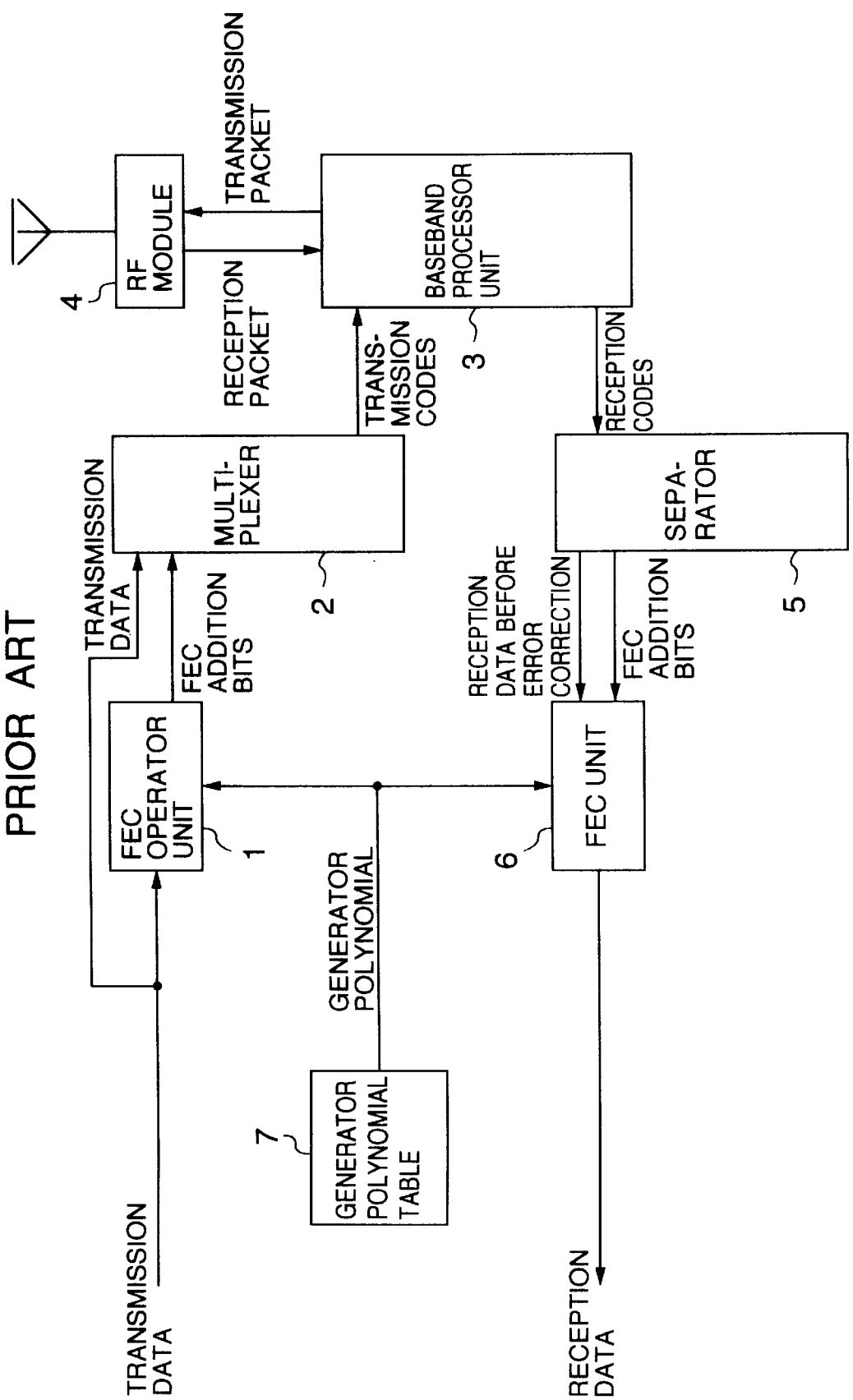
FIG. 4 is a block diagram showing a conventional radio communication apparatus.

An embodiment of the invention will be described with reference to the accompanying drawings. FIG. 1 is a block diagram showing a radio communication apparatus according to an embodiment of the invention, and FIG. 2 is a diagram showing the configuration of a packet used for data transmission/reception between radio communication apparatuses of this embodiment.

Referring to FIG. 1, reference numeral 11 represents an FEC operator unit for calculating FEC addition bits to be added to transmission data. Reference numeral 12 represents a multiplexer for multiplexing transmission data, FEC addition bits, and other data to thereby configure a transmission packet.

Reference numeral 13 represents a baseband processor unit for performing a baseband signal communication process in accordance with protocols of a mobile communication network such as PHS networks. Specifically, the baseband processor unit 13 loads a transmission packet supplied from the multiplexer 12 on the baseband signal satisfying the protocols, and unloads a reception packet supplied from the RF module 14 from the baseband signal. The RF module 14 modulates the baseband signal to generate radio wave signals, and demodulates received radio wave signals into the baseband signal.

Reference numeral 17 represents an electric field intensity measuring unit for measuring the electric field intensity of received radio waves and outputting the measured electric field intensity data. Reference numeral 18 represents a generator polynomial determining unit for determining a generator polynomial in accordance with a current electric field intensity. This generator polynomial determining unit 18 determines a generator polynomial by referring to a generating polynomial table 20 and in accordance with the electric field data supplied from the electric field measuring unit 17. The FEC operator unit 11 calculates FEC addition bits of transmission data by using a generator polynomial determined by the generator polynomial determining unit 18.

The multiplexer 12 multiplexes a generator polynomial table number, FEC addition bits supplied from the FEC operator unit 11, transmission data, and other data to configure a transmission packet shown in FIG. 2. The generator polynomial table number identifies a generator polynomial determined by the generator polynomial determining unit 18.

Reference numeral 15 represents a separator which separates a packet received from the baseband processor unit 13 into reception data before error correction, FEC addition bits and a generator polynomial table number. Reference numeral 19 represents a generator polynomial judging unit for judging a generator polynomial in accordance with the generator polynomial table number supplied from the separator 15, and outputting a judged generator polynomial. Reference numeral 20 represents a generator polynomial table which stores a plurality of generator polynomials each for generating a different number of error correction addition bits. FIG. 3 shows the generator polynominal table according to the present embodiment.

A plurality of generator polynomials are prepared by changing the code length n of a binary cyclic code (n, k) in the following equation, in accordance with an electric field intensity. The prepared generator polynomials are stored in the generator polynomial table 20, each being related to its specific generator polynomial table number as shown in FIG. 3.

$$g(X) = a_{n-k-1} \cdot X^{n-k-1} + a_{n-k-2} \cdot X^{n-k-2} + a_{n-k-3} \cdot X^{n-k-3} + \ldots + a_1 \cdot X + a_0$$

As shown in FIG. 3, if an electric field intensity is strong, a generator polynomial g(x) having a generator polynomial table number $Y_I$ is selected. The generator polynomial g(x) with the generator polynomial table number $Y_I$ is set to have a smaller dimension, so that the number of FEC addition bits can be reduced. Conversely, if an electric field intensity is weak, a generator polynomial table number $y_n$ is selected to determine a generator polynomial g(x) having a larger dimension. The generator polynomial g(x) having a larger dimension increases the number of FEC addition bits to thereby improve the error correction capability. In the above manner, the generator polynomial determining unit 18 outputs a generator polynomial table number in accordance with the measured electric field intensity and supplies it to the generator polynomial table 20 and multiplexer 12.

Reference numeral 16 represents an FEC unit which performs error detecting and correction of the reception data before error correction supplied from the separator 15, in accordance with the generator polynomial output from the generator polynomial judging unit 19 and the FEC addition bits output from the separator 15, and outputs the error-detected and error-corrected data.

Referring to FIG. 2, reference numeral 31 represents a packet start detection flag field and reference numeral 32 represents a generator polynomial table number field. Reference numeral 33 represents an address field and reference numeral 34 represents a control field. Reference numeral 35 represents a data field for loading data such as audio and moving image data to be transmitted. Reference numeral 36 represents an FEC addition bit field and reference numeral 37 represents a packet end detection flag field.

In the radio communication apparatus of this embodiment, the electric field intensity measuring unit 17 always measures an electric field from received power information supplied from the RF module 14. In accordance with an electric field intensity measured with the electric field intensity measuring unit 17, the generator polynomial determining unit 18 determines a generator polynomial.

The generator polynomial determining unit 18 selects one of a plurality of generator polynomials in the following manner. If an electric field intensity is high, it can be supposed that a random error rate is low. Therefore, in the case of a high electric field intensity, since even a low error correction capability is sufficient, a generator polynomial providing a smaller number of FEC addition bits is selected.

Conversely, if an electric field intensity is low, it can be supposed that a random error rate is high. In this case, therefore, it is necessary to provide a high error correction capability. A generator polynomial providing a larger number of FEC addition bits is selected if the electric field intensity is low.

As shown in FIG. 3, if the electric field intensity is high, a generator polynomial table number $y_1$ is selected to reduce the number of FEC addition bits. Conversely, if the electric field intensity is low, a generator polynomial table number $y_n$ is selected to increase the number of FEC addition bits and enhance the error correction capability.

The generator polynomial determining unit 18 outputs the selected generator polynomial table number which is supplied to the generator polynomial table 20 and multiplexer 12. The generator polynomial table 20 outputs a generator polynomial corresponding to the input generator polynomial table number, which generator polynomial is input via the generator polynomial determining unit 18 to the FEC operator unit 11.

For data transmission, the FEC operator unit 11 calculates FEC addition bits of the transmission data, by using the supplied generator polynomial. The transmission data includes audio data, moving picture data, or the like to be loaded in the data field 35 shown in FIG. 2, and data to be loaded in the address and control fields 33 and 34 shown in FIG. 2. As shown in FIG. 2, the FEC addition bits are added to the packet in the FEC addition bit field 36 after the transmission data.

The FEC addition bits are calculated as coefficients of a remainder polynomial obtained by dividing the transmission data by the generator polynomial g(x). The FEC addition bits output from the FEC operator unit 1, the generator polynomial table number output from the generator polynomial determining unit 18, and the transmission data are multiplexed by the multiplexer 12 to configure a transmission packet shown in FIG. 2.

As shown in FIG. 2, the packet start and end detection flags are also loaded in the flag fields 31 and 37. The baseband processor unit 13 loads the transmission packet on a baseband signal by performing division, conversion and other processes so as to match time slots of protocols such as TDMA/TDD of a mobil communication system such as PHS system, or unloads a reception packet from the baseband received from the RF module 14 by performing conversion, synthesis and other processes.

The RF module 14 modulates the baseband signal so as to match air interface, and converts it into an RF signal which is transmitted to a partner radio communications apparatus.

Next, the reception operation of data transmitted from a partner radio communication apparatus will be described. The RF module 14 receives an RF signal from a communication partner and demodulates it via the air interface into a baseband signal.

The separator 15 detects sync signals of the reception packet from the packet start and end detection flag fields 31 and 37, and in accordance with the sync signals, separates the reception packet into FED addition bits, reception data before error correction, and a generator polynomial table number.

The generator polynomial judging unit 19 sends the generator polynomial table number received from the separator 15 to the generator polynomial table 20 which outputs a generator polynomial corresponding to the received generator polynomial table number and supplies it via the generator polynomial judging unit 19 to the FEC unit 16. The separator 15 also supplies the FEC unit 16 with the data (received data before error correction) and FEC addition bits separated from the reception packet in the packet fields 35 and 36.

By using the supplied generator polynomial, the FEC unit detects and corrects any error of the reception data before error correction, in accordance with the FEC addition bits. The corrected reception data is then output. The reception data includes the data in the data field 35, address field 33 and control field 34 shown in FIG. 2.

As described above, according to the error correction method of this embodiment, if an electric field intensity is low and therefore a high random error rate is predicted, the error correction capability is increased. On the other hand, if an electric field intensity is large and therefore a low random error rate is predicted, the number of FEC addition bits is reduced to improve information transfer throughput and allow more efficient data communication.

What is claimed is:

1. A radio communication apparatus comprising:

a radio frequency module for converting a transmission baseband signal into a transmission radio wave and deriving a reception baseband signal from a received radio wave;

electric field intensity measuring means for measuring electric field intensity of the received radio wave and outputting the measured electric field intensity;

generator polynomial determining means for determining a generator polynomial, which is used to generate error correction addition bits, in accordance with the measured electric field intensity output from said electric field intensity measuring means;

an error correction operator unit for calculating the error correction addition bits of transmission data by using the generator polynomial determined by said generator polynomial determining means;

multiplexer means for multiplexing generator polynomial information associated with the generator polynomial determined by said generator polynomial determining means, the error correction addition bits calculated by said error correction operator unit, and the transmission data to obtain multiplexed data; and signal processing means for converting said multiplexed data into the transmission baseband signal having a format matching a protocol of a mobile communication network, and outputting the transmission baseband signal to said radio frequency module.

2. A radio communication apparatus comprising:

a radio frequency module for converting a transmission baseband signal into a transmission radio wave and deriving a reception baseband signal from a received radio wave;

electric field intensity measuring means for measuring electric field intensity of the received radio wave and outputting the measured electric field intensity;

storing means for storing a plurality of generator polynomials in relation to a plurality of generator polynomial numbers respectively:

first generator polynomial determining means for determining one of said plurality of generator polynomials by referring to said storing means and in accordance with the measured electric field intensity output from said electric field intensity measuring means;

an error correction operator unit for calculating error correction addition bits of transmission data by using the generator polynomial determined by said first generator polynomial determining means;

multiplexer means for multiplexing one of said plurality of generator polynomial numbers representative of the one of said generator polynomials determined by said first generator polynomial determining means, the error correction addition bits calculated by said error correction operator unit, and the transmission data to obtain multiplexed data;

baseband processor means for converting said multiplexed data into the transmission baseband signal having a format matching a protocol of a mobile communication network, and extracting a reception packet from the reception baseband signal supplied by said radio frequency module;

separator means for separating the reception packet extracted by said baseband processor means into reception data, the error correction addition bits and the generator polynomial number;

second generator polynomial determining means for determining a generator polynomial in accordance with the generator polynomial number separated by said separator means; and an error correction unit for detecting and correcting any error included in the reception data separated by said separator means and recovering the error-corrected reception data by using the generator polynomial determined by said second generator polynomial determining means and the error correction addition bits separated by said separator means.

3. A radio communication apparatus comprising:

a radio frequency module for converting a transmission baseband signal into a transmission radio wave and deriving a reception baseband signal from a received radio wave;

electric field intensity measuring means for measuring electric field intensity of the received radio wave and outputting the measured electric field intensity;

first generator polynomial determining means for determining a generator polynomial by referring to a generator polynomial table and in accordance with the measured electric field intensity output from said electric field intensity measuring means, said generator polynomial table storing a plurality of generator polynomials in relation to a plurality of generator polynomial numbers respectively;

an error correction operator unit for calculating error correction addition bits of transmission data by using the generator polynomial determined by said first generator polynomial determining means;

multiplexer means for multiplexing one of said plurality of generator polynomial numbers representative of the generator polynomial determined by said first generator polynomial determining means, the error correction addition bits calculated by said error correction operator unit, and the transmission data to obtain multiplexed data;

baseband processor means for converting said multiplexed data of said multiplexer means into the transmission baseband signal having a format matching a protocol of a mobile communication network, and extracting a reception packet from the reception baseband signal supplied by said radio frequency module;

separator means for separating the reception packet extracted by said baseband processor means into reception data, the error correction addition bits and the generator polynomial number;

second generator polynomial determining means for determining a generator polynomial by referring to said generator polynomial table and in accordance with the generator polynomial number separated by said separator means; and an error correction unit for detecting and correcting any error included in the reception data separated by said separator means and recovering the error-corrected reception data by using the generator polynomial output from said second generator polynomial determining means and the error correction addition bits separated by said separator means.

4. An error correction method for radio communication, said method comprising the steps of:

measuring electric field intensity by using received power information supplied by a radio frequency module;

determining a generator polynomial, which is used to generate error correction addition bits, in accordance with the measured electric field intensity;

calculating the error correction addition bits of transmission data by using the determined generator polynomial;

multiplexing generator polynomial information associated with the determined generator polynomial, the calculated error correction addition bits and the transmission data to obtain multiplexed data, and converting the multiplexed data into a transmission baseband signal having a format matching a protocol of a mobile communication network; and modulating the transmission baseband signal into a transmission radio wave and transmitting the transmission radio wave.

5. An error correction method for radio communication, said method comprising the steps of:

storing in a storing means a plurality of generator polynomials in relation to a plurality of generator polynomial numbers respectively;

measuring electric field intensity by using received power information supplied by a radio frequency module;

determining a generator polynomial by referring to said storing means and in accordance with the measured electric field intensity;

calculating error correction addition bits of transmission data by using the determined generator polynomial;

multiplexing one of said plurality of generator polynomial numbers representative of the determined generator polynomial, the calculated error correction addition bits and the transmission data to obtain multiplexed data, and converting the multiplexed data into a transmission baseband signal having a format matching a protocol of a mobile communication network;

modulating the transmission baseband signal into a transmission radio wave and transmitting the transmission radio wave;

extracting a reception packet from a reception baseband signal received by said radio frequency module;

separating the reception packet into reception data, the error correction addition bits and the generator polynomial number; and determining a corresponding generator polynomial in accordance with the separated generator polynomial number; and detecting and correcting any error included in the separated reception data and recovering the error-corrected reception data by using the corresponding generator polynomial and the separated error correction addition bits.

6. An error correction method for radio communication, said method comprising the steps of:

measuring electric field intensity by using received power information supplied by a radio frequency module;

determining a generator polynomial by referring to a generator polynomial table and in accordance with the measured electric field intensity, said generator polynomial table storing a plurality of generator polynomials in relation to a plurality of generator polynomial numbers respectively;

calculating error correction addition bits of transmission data by using the determined generator polynomial;

multiplexing one of said plurality of generator polynomial numbers representative of the determined generator polynomial, the calculated error correction addition bits and the transmission data to obtain multiplexed data, and converting the multiplexed data into a transmission baseband signal having a format matching a protocol of a mobile communication network;

modulating the transmission baseband signal into a transmission radio wave and transmitting the transmission radio wave;

extracting a reception packet from a reception baseband signal received by said radio frequency module;

separating the extracted reception packet into reception data, the error correction addition bits and the generator polynomial number;

supplying the separated generator polynomial number to said generator polynomial table to determine a corresponding generator polynomial; and detecting and correcting any error included in the separated reception data and recovering the error-corrected reception data by using the corresponding generator polynomial and the separated error correction addition bits.

\* \* \* \* \*